United States Patent
Kim et al.

(10) Patent No.: US 8,389,601 B2
(45) Date of Patent: Mar. 5, 2013

(54) INKJET INK COMPOSITION

(75) Inventors: Tae-Hoon Kim, Anyang-si (KR);
Dong-Hoon Kim, Seongnam-si (KR);
Byung-Ho Jun, Seoul (KR); Joon-Rak Choi, Suwon-si (KR); Young-Kwan Seo, Suwon-si (KR); Young-Il Lee, Hwasung-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 558 days.

(21) Appl. No.: 12/636,378

(22) Filed: Dec. 11, 2009

(65) Prior Publication Data
US 2011/0040014 A1    Feb. 17, 2011

(30) Foreign Application Priority Data
Aug. 17, 2009  (KR) .................. 10-2009-0075719

(51) Int. Cl.
| | |
|---|---|
| B01F 17/00 | (2006.01) |
| B32B 7/12 | (2006.01) |
| B32B 27/28 | (2006.01) |
| B41J 2/01 | (2006.01) |
| B41J 2/17 | (2006.01) |
| B41J 2/175 | (2006.01) |
| B60C 1/00 | (2006.01) |
| C07F 9/90 | (2006.01) |
| C08G 63/60 | (2006.01) |
| C08J 3/00 | (2006.01) |
| C08K 3/08 | (2006.01) |
| C08K 5/00 | (2006.01) |
| C08K 5/01 | (2006.01) |
| C08K 5/09 | (2006.01) |
| C08K 5/10 | (2006.01) |
| C08K 5/16 | (2006.01) |
| C08L 9/00 | (2006.01) |
| C08L 67/00 | (2006.01) |
| C08L 73/00 | (2006.01) |
| C08L 79/00 | (2006.01) |
| C09D 1/00 | (2006.01) |
| C09D 4/00 | (2006.01) |
| C09D 5/00 | (2006.01) |
| C09D 11/00 | (2006.01) |
| C09K 3/00 | (2006.01) |
| G01D 11/00 | (2006.01) |
| H01B 3/44 | (2006.01) |

(52) U.S. Cl. .................. 523/160; 106/31.01; 106/31.13; 106/31.6; 106/31.65; 106/31.66; 106/31.67; 106/31.75; 106/31.85; 106/31.88; 106/31.9; 347/1; 347/85; 347/95; 347/100; 523/161; 524/186; 524/284; 524/300; 524/301; 524/439; 524/483; 524/571; 524/599; 524/601; 977/777

(58) Field of Classification Search ............... 523/160, 523/161; 524/186, 284, 300, 439, 483, 571, 524/599, 601, 301; 347/1, 85, 95, 100; 977/777; 106/31.01, 31.13, 31.6, 31.65, 31.66, 31.67, 106/31.75, 31.85, 31.88, 31.9
See application file for complete search history.

(56) References Cited

U.S. PATENT DOCUMENTS

2009/0136770 A1 * 5/2009 Hirakoso et al. ............. 428/457

FOREIGN PATENT DOCUMENTS

| JP | 2007-197558 A | 8/2007 |
|---|---|---|
| WO | WO-2007-126012 A1 | 11/2007 |
| WO | WO 2008/013002 * | 1/2008 |
| WO | WO-2008-018718 A1 | 2/2008 |
| WO | WO-2008/053917 A1 | 5/2008 |
| WO | WO-2009-066396 A1 | 5/2009 |

OTHER PUBLICATIONS

Japanese Office Action, and partial English Patent translation thereof, issued in Japanese Application No. 2009-285730 dated Jul. 31, 2012.

* cited by examiner

*Primary Examiner* — Patrick Niland
(74) *Attorney, Agent, or Firm* — McDermott Will & Emery LLP

(57) ABSTRACT

The invention is to provide a metal ink composition for ink-jet and more particularly, a metal ink composition which causes no formation of cracks on a PCB substrate, allows a low curing temperature, and provides improved adhesive strength even after coating.

4 Claims, 2 Drawing Sheets

INKJET INK COMPOSITION

CROSS-REFERENCE TO RELATED APPLICATIONS

This application claims the benefit of Korean Patent Application No. 10-2009-0075719 filed on Aug. 17, 2009, with the Korea Intellectual Property Office, the contents of which are incorporated here by reference in their entirety.

BACKGROUND

1. Technical Field

It relates to a metal ink composition for ink-jet and more particularly, a metal ink composition which causes no formation of cracks on a PCB substrate, allows a low temperature curing, and provides improved adhesive strength after coating.

2. Description of the Related Art

Noncontact direct writing technology through inkjet offers advantages in reduction of manufacturing costs and time since it allows ejecting an exact amount of ink to only a desired portion. For applying the inkjet method to form metal wires on a PCB substrate, a metal ink has been greatly developed with growth of interests in the metal ink.

Metal inks in market are a water-based metal ink, a non-water-based metal ink and a solvent-based ink which are divided according to types of solvent. A solvent of metal ink is selected according to a coating material to be used in manufacturing metal nanoparticles. Each ink has advantages and disadvantages. The non-water-based metal ink has a less particle size than the water-based metal ink and allows mass production in high concentration and continuous ejection through a head. However, it causes significant cracks of wires in a printed image and requires a surface treatment due to ununiform CD (critical dimesion) and curing at a high temperature of 250° C. or higher.

Metal nano ink, which is printed on a polyimide, is needed to maintain its adhesive strength and be thus used for printed wires after a coating process in order to be applied for PCB substrates. However, the non-water-based nano ink does not maintain the adhesive strength since a coating solution percolates after printing wires so that it causes delamination of wires and deteriorates mechanical property of wires. Providing appropriate properties as wires is the most important factor in the nano metal ink. Such properties are adhesive strength to a substrate, a low curing temperature and prevention of forming cracks for a metal ink composition. It is the most difficult problem to satisfy such requirements in the development of metal ink composition.

SUMMARY

In order to resolve such problems associated with the conventional technology, it provides a metal ink composition for ink-jet print which does not cause the formation of cracks, allows a low temperature curing, and provides improved adhesive strength and mechanical strength.

A metal ink composition for ink-jet according to the invention does not cause cracks on a PCB substrate, allows curing at a low temperature and particularly provides improved adhesive strength after coating which further allows forming circuit patterns.

According to an embodiment, there is provided a metal ink composition for ink-jet including 20 to 85 parts by weight of metal nanoparticles, 10 to 70 parts by weight of a non-water-based organic solvent, and 1 to 10 parts by weight of at least one additive chosen from unsaturated polyester polymer, butadiene based monomer and butadiene based polymer.

According to an embodiment, the metal nanoparticles may be at least one metal chosen from gold, silver, nickel, indium, zinc, titanium, copper, chromium, tungsten, platinum, iron, cobalt and an alloy thereof.

According to an embodiment, the surface of the metal nanoparticles may be capped with at least one dispersing agent chosen from fatty acid and fatty amine.

According to an embodiment, the metal nanoparticles may have a size of 200 nm or less, preferably 50 nm or less.

According to an embodiment, the non-water-based organic solvent may be at least one chosen from hexane, dodecane, decane, undecane, tetradecane, hexadecane, 1-hexadecene, 1-octadecene, hexylamine, bis-2-ethylhexylamine, octanol, decalin and tetralin.

According to another aspect of the invention, the butadiene based polymer or monomer may be at least one chosen from polybutadiene oil and butadiene monomer.

DETAILED DESCRIPTION

Figure 1:
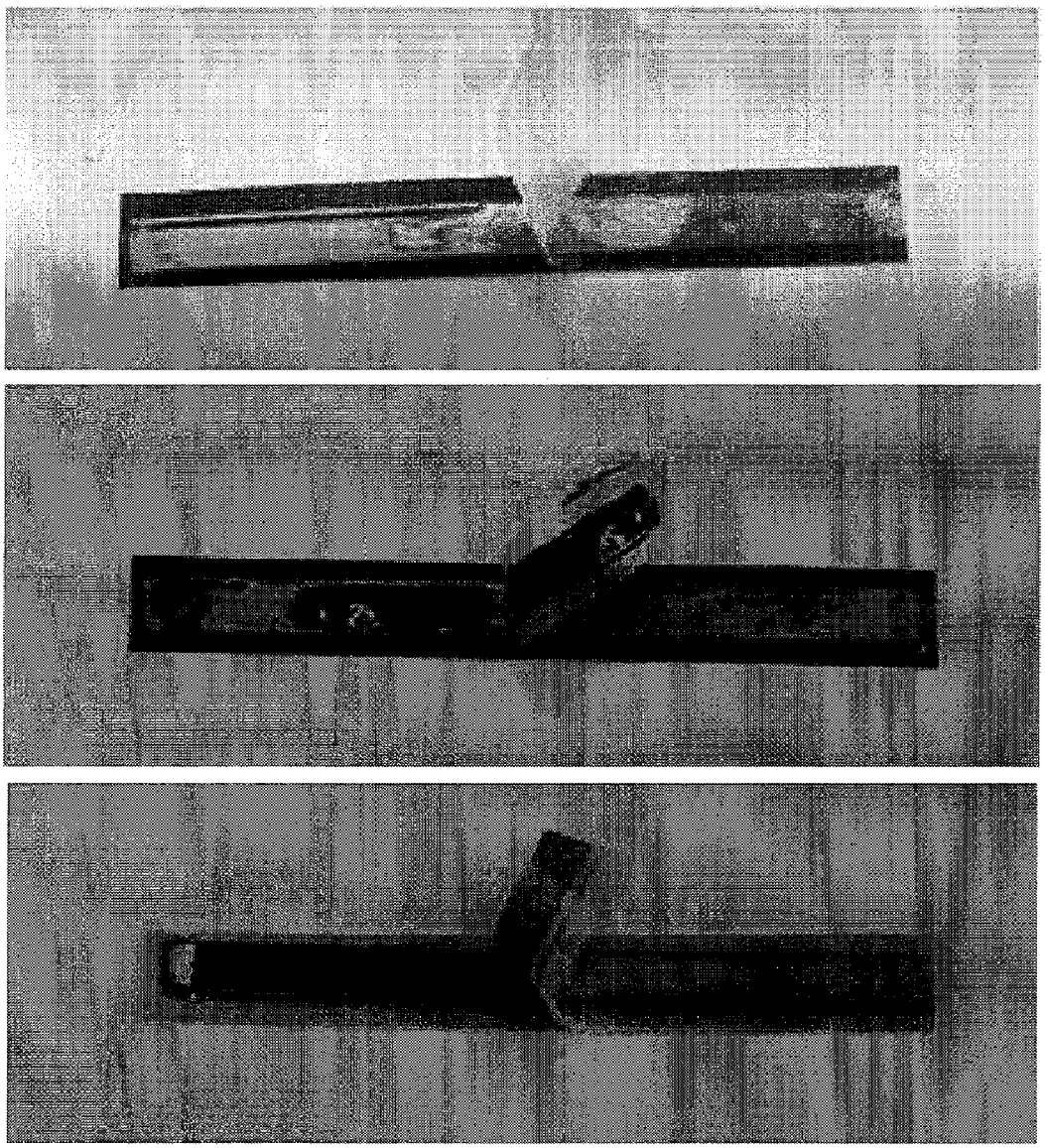
FIG. 1 illustrates a method for determining adhesive strength of printed wires formed by using a metal ink composition according to tape test.

While the present invention has been described with reference to particular embodiments, it is to be appreciated that various changes and modifications may be made by those skilled in the art without departing from the spirit and scope of the present invention, as defined by the appended claims and their equivalents. Throughout the description of the present invention, when describing a certain technology is determined to evade the point of the present invention, the pertinent detailed description will be omitted.

The terms used in the description are intended to describe certain embodiments only, and shall by no means restrict the present invention. Unless clearly used otherwise, expressions in the singular number include a plural meaning. In the present description, an expression such as "comprising" or "consisting of" is intended to designate a characteristic, a number, a step, an operation, an element, a part or combinations thereof, and shall not be construed to preclude any presence or possibility of one or more other characteristics, numbers, steps, operations, elements, parts or combinations thereof.

Hereinafter, preferred embodiments will be described in detail of the metal ink composition for ink-jet according to the present invention.

A metal of metal nanoparticles in the metal ink composition may be at least one chosen from gold, silver, nickel, indium, zinc, titanium, copper, chromium, tungsten, platinum, iron, cobalt and an alloy thereof, but it is not limited thereto. The less size of the metal particles the easier ejection of ink through a nozzle of an ink-jet. A size of 200 nm or less of metal nanoparticles, preferably 50 nm or less, may be used in ink for ink-jet to form proper droplets during the ejection.

The metal ink composition for ink-jet may include 20 to 85 parts by weight of metal nanoparticles, 10 to 70 parts by weight of a non-water-based organic solvent and 1 to 10 parts by weight of at least one additive chosen from unsaturated polyester and butadiene polymer and monomer. The surface of the metal nanoparticles may be capped with fatty acid or fatty amine or with both fatty acid and fatty amine as a dispersing agent. The additive may be well mixed and compatible with a non-water-based solvent and be suitable for capping the nanoparticles as a fat-soluble dispersing agent such as fatty acid or fatty amine. Such additives are not suitable when a water-soluble dispersing agent such as PVP and polyacid is used for capping.

In the metal ink composition, the metal nanoparticles may be included by 20 to 85 parts by weight. When the amount is less than 20 parts by weight, it limits its applications as wire since the amount of metal is not enough and when it is more than 85 parts by weight, it increases viscosity too high and thus deteriorates ejection result which is not finally suitable for a metal ink. Preferably, it may be included by 50 to 70 parts by weight not only to maintain a high concentration of a metal but also to facilitate flow of ink.

An organic solvent used in the metal ink composition may be a non-water-based solvent which is at least one chosen from hexane, octane, decane, undecane, tetradecane, hexadecane, 1-hexadecene, 1-octadecne, hexylamine, and bis-2-ethylhexylamine. It may be used alone or in a combination of 2 or more.

Since a solvent in the metal ink plays a key role to dry ink wires ejected on a substrate, it can be mixed to have an appropriate dry property for ink-jet by using difference in temperature between boiling point (BP) and Host point (FP) of a solvent. For example, a solvent having a high boiling point such as 1-octadecane may delay drying and a solvent having a low boiling point such as bis-2-ethylhexylamine, tetralin, decalin, dodecane, octanol and the like may accelerate drying.

The non-water-based organic solvent may be used by 10 to 70 parts by weight and in order to maximize the concentration of a metal, it is apparent to use a minimum amount of the organic solvent. When amount of the organic solvent is less than 10 parts by weight, it may cause blocking of a nozzle since drying rate becomes too fast and deteriorates the dispersion of particles. On the other hand, when it is more than 70 parts by weight, it may not be preferable to form metal wires having reliability since the amount of a metal becomes relatively low. Preferably, amount of the non-water-based organic solvent is used by 20 to 40 parts by weight.

Unsaturated polyester polymers which can be used in the metal ink composition of the invention are FA156 (Aekyung Chemical), propylene glycol (industrial grade, PGI, Dow), Dynapol (Evonik Degussa DYNAPOL® LH 828 Polyester Resin), SOLPLUS® TX 5 (Lubrizol) and the like.

COMPARISON EXAMPLES AND EXAMPLES

Comparison Examples 1-3 and Examples 1-5 were performed by the following procedure and the result therefrom was summarized in Table 1.

A metal ink composition including metal nano powder, a solvent and an additive (not used in Comparison Examples) was prepared and then wire was printed to be 0.5 cm*10 cm (700 dpi) by using an ink-jet print. Electrical conductivity, adhesive strength and pencil hardness of the printed wire were determined (Table 1).

The adhesive strength was determined by using 3M tape having adhesiveness of 0.65 kN/m and BYK gardener according to ASTM D3359(Measuring Adhesion by Tape Test) as shown in FIG. 1. The adhesive strength was rated as follows.

<Adhesive Rating>

5 B: No noticeable removal of the coating

4 B: Less than 5% of the coating removed

3 B: 5-15% of the coating removed

2 B: 15-35% of the coating removed

1 B: 35-65% of the coating removed

0 B: more than 65% of the coating removed which is worse than 1 B

The mechanical strength (hardness) of the wire, which was printed to be 0.5 cm*10 cm (700 dpi) using an ink-jet print and cured at a temperature of 250° C. for 1 hr, was determined by using a pencil hardness tester.

The electrical conductivity was determined by measuring specific resistance ($\mu\Omega cm$). It was determined, after forming wire to be 0.5 cm*10 cm (700 dpi) by using Spectra Se-128 Head, by measuring a thickness to determine specific resistance using a 3D profiler.

Comparison Example 1

An ink composition was prepared by using 60 wt % of Ag nanoparticles and 40 wt % of decalin without adding any additive. Each property of electrical conductivity, adhesive strength and pencil hardness was determined by the same procedure described above and the result was summarized in Table 1. Adhesive strength was 0 B and pencil hardness was 1 H which was very low.

Comparison Example 2

An ink composition was prepared by using 30 wt % of Cu nanoparticles and 70 wt % of tetradecane without adding any additive. Each property of electrical conductivity, adhesive strength and pencil hardness was determined by the same procedure described above and the result was summarized in Table 1. Adhesive strength was 0 B and pencil hardness was 2H which was very low.

Comparison Example 3

An ink composition was prepared by using 50 wt % of Au nanoparticles and 50 wt % of tetradecane without adding any additive. Each property of electrical conductivity, adhesive strength and pencil hardness was determined by the same procedure described above and the result was summarized in Table 1. Adhesive strength was 0 B and pencil hardness was 3H which was very low.

Example 1

An ink composition was prepared by using 60 wt % of Ag nanoparticles, 38 wt % of decalin, and 2 wt % of Dynapol (Evonik Degussa DYNAPOL® LH 828 Polyester Resin) as an additive. Each property of electrical conductivity, adhesive strength and pencil hardness was determined by the same procedure described above and the result was summarized in Table 1. Adhesive strength was 4 B and pencil hardness was 7 H which were much higher than those in Comparison Examples.

Example 2

An ink composition was prepared by using 30 wt % of Cu nanoparticles, 68 wt % of octanol, and 2 wt % of FA156 (Aekyung Chemical) as an additive. Each property of Electrical conductivity, adhesive strength and pencil hardness was determined by the same procedure described above and the result was summarized in Table 1. Adhesive strength was 3 B and pencil hardness was 7 H which were much higher than those in Comparison Examples.

Example 3

An ink composition was prepared by using 50 wt % of Au nanoparticles, 48 wt % of tetradecane, and 2 wt % of polyisobutene oil (BASF) as an additive. Each property of electrical conductivity, adhesive strength and pencil hardness was determined by the same procedure described above and the result was summarized in Table 1. Adhesive strength was 3 B and pencil hardness was 6H which were much higher than those in Comparison Examples.

Example 4

An ink composition was prepared by using 40 wt % of Cu nanoparticles, 67 wt % of tetralin, and 3 wt % of Dynapol (Evonik Degussa DYNAPOL® LH 828 Polyester Resin) as an additive. Each property of electrical conductivity, adhesive strength and pencil hardness was determined by the same procedure described above and the result was summarized in Table 1. Adhesive strength was 5 B and pencil hardness was 8H which were much higher than those in Comparison Examples.

Example 5

An ink composition was prepared by using 40 wt % of Ag nanoparticles, 58 wt % of tetralin, and 1 wt % of Dynapol (Evonik Degussa DYNAPOL® LH 828 Polyester Resin) and 1 wt % of polyisobuene oil as an additive. Each property of electrical conductivity, adhesive strength and pencil hardness was determined by the same procedure described above and the result was summarized in Table 1. Adhesive strength was 5 B and pencil hardness was 8H which were much higher than those in Comparison Examples.

TABLE 1

| | Nanoparticles | solvent | Dynapol | FA156 | Poly isobutene oil | Electric conductivity (uΩ·cm) | Adhesive | Pencil hardness |
|---|---|---|---|---|---|---|---|---|
| Example 1 | Ag 60 wt % | Decalin, 38 wt % | 2 wt % | | | 10 | 4B | 7H |
| Example 2 | Cu 30 wt % | Octanol, 68 wt % | | 2 wt % | | 11 | 3B | 7H |
| Example 3 | Au 50 wt % | Tetradecane, 48 wt % | | | 2 wt % | 30 | 3B | 6H |
| Example 4 | Cu 40 wt % | Tetralin, 67 wt % | 3 wt % | | | 7 | 5B | 8H |
| Example 5 | Ag 40 wt % | Tetralin, 58 wt % | 1 wt % | | 1 wt % | 80 | 5B | 8H |
| Comparison Example 1 | Ag 60 wt % | Decalin, 40 wt % | — | — | — | 8 | 0B | 1H |
| Comparison Example 2 | Cu 30 wt % | Tetradecane, 70 wt % | — | — | — | 6 | 0B | 2H |
| Comparison Example 3 | Au 50 wt % | Tetradecane, 50 wt % | — | — | — | 27 | 0B | 3H |

Figure 2:
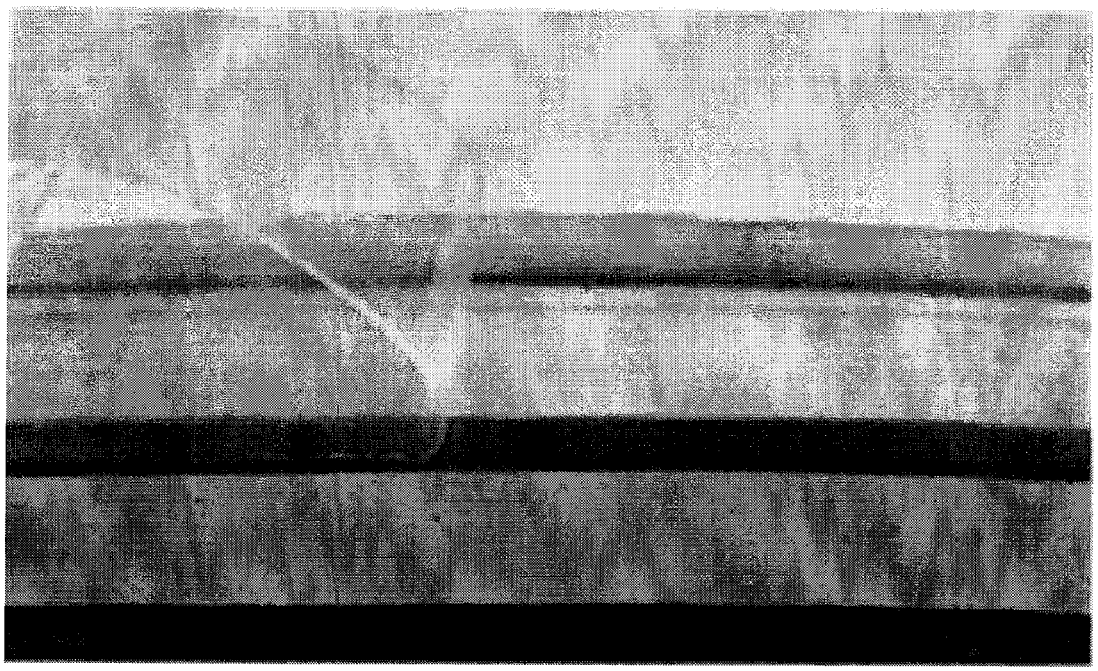
FIG. 2 illustrates adhesive strength of printed wires formed by using a metal ink composition of Example 4.

As shown in Table 1 for Comparison Examples 1 to 3 and Examples 1 to 5, it was noted that when the lipophilic metal ink composition prepared by adding an additive such as Dynapol, FA156 and polyisobutadiene oil was cured at a low temperature, there was no formation of cracks and it exhibited significantly improved adhesive strength and pencil hardness (see FIG. 2). The electrical conductivity was also determined as 7-30 uΩ·cm. Therefore, it proves that the metal ink composition of the invention eliminates the problems associated with the conventional technology and shows excellent physical properties so that it is suitable for PCB uses.

While it has been described with reference to particular embodiments, it is to be appreciated that various changes and modifications may be made by those skilled in the art without departing from the spirit and scope of the embodiment herein, as defined by the appended claims and their equivalents.

Much more Examples except Examples described herein will be in the scope of the invention.

What is claimed is:

1. A metal ink composition for ink-jet comprising:
    50 to 70 parts by weight of metal nanoparticles having a size of 200 nm or less capped with at least one dispersing agent selected from the group consisting of a fatty acid and a fatty amine;
    20 to 40 parts by weight of a non-water-based organic solvent; and
    1 to 10 parts by weight of at least one additive selected from the group consisting of polybutadiene oil and butadiene monomer.

2. The metal ink composition of claim 1, wherein the metal of the metal nanoparticles is at least one selected from the group consisting of gold, silver, nickel, indium, zinc, titanium, copper, chromium, tungsten, platinum, iron, cobalt and an alloy thereof.

3. The metal ink composition of claim 1, wherein the metal nanoparticles has a size of 50 nm or less.

4. The metal ink composition of claim 1, wherein the non-water-based organic solvent is at least one selected from the group consisting of hexane, dodecane, decane, undecane, tetradecane, hexadecane, 1-hexadecene, 1-octadecene, hexylamine, bi-2-ethylhexylamine, octanol, decalin and tetralin.

* * * * *